(12) United States Patent
George

(10) Patent No.: US 12,313,871 B2
(45) Date of Patent: May 27, 2025

(54) FLEXIBLE WIRE GRID POLARIZER

(71) Applicant: Moxtek, Inc., Orem, UT (US)

(72) Inventor: Matthew C. George, Lindon, UT (US)

(73) Assignee: Moxtek, Inc., Orem, UT (US)

( * ) Notice: Subject to any disclaimer, the term of this patent is extended or adjusted under 35 U.S.C. 154(b) by 4 days.

(21) Appl. No.: 18/499,617

(22) Filed: Nov. 1, 2023

(65) Prior Publication Data

US 2024/0061161 A1  Feb. 22, 2024

Related U.S. Application Data

(63) Continuation of application No. 17/464,936, filed on Sep. 2, 2021, now Pat. No. 11,846,793, which is a continuation of application No. 16/673,193, filed on Nov. 4, 2019, now Pat. No. 11,150,391.

(60) Provisional application No. 62/773,664, filed on Nov. 30, 2018.

(51) Int. Cl.
  *G02B 5/30* (2006.01)

(52) U.S. Cl.
  CPC ................... *G02B 5/3058* (2013.01)

(58) Field of Classification Search
  CPC .................................................. G02B 5/3058
  See application file for complete search history.

(56) References Cited

U.S. PATENT DOCUMENTS

| | | | |
|---|---|---|---|
| 6,122,103 A | 9/2000 | Perkins et al. | |
| 6,532,111 B2 | 3/2003 | Kurtz et al. | |
| 7,961,393 B2 | 6/2011 | Perkins et al. | |
| 8,755,113 B2 | 6/2014 | Gardner et al. | |
| 2006/0113279 A1 | 6/2006 | Little | |
| 2006/0118514 A1 | 6/2006 | Little et al. | |
| 2007/0252293 A1* | 11/2007 | Sato | B29D 11/00788 264/1.31 |
| 2012/0105745 A1* | 5/2012 | Kumai | G02B 5/3058 349/5 |
| 2016/0018579 A1 | 1/2016 | Smirnov et al. | |
| 2016/0357064 A1 | 12/2016 | Nielson et al. | |
| 2017/0068032 A1 | 3/2017 | Son et al. | |
| 2018/0269100 A1 | 9/2018 | Huang et al. | |
| 2019/0390328 A1 | 12/2019 | Smirnov et al. | |
| 2020/0133342 A1 | 4/2020 | Choi et al. | |
| 2020/0249383 A1 | 8/2020 | Foley | |
| 2021/0302639 A1* | 9/2021 | Sakakibara | G02F 1/1335 |

* cited by examiner

*Primary Examiner* — Stephone B Allen
*Assistant Examiner* — Adam W Booher
(74) *Attorney, Agent, or Firm* — Thorpe North & Western, LLP

(57) ABSTRACT

A wire grid polarizer (WGP) can include a flexible substrate. The flexible substrate might be desirable for WGP flexibility or to aid in further processing of the WGP. Wires of the WGP can include flexible ribs to minimize or avoid defects such as cracks in the WGP. An etch stop layer in the wires can allow formation of the flexible ribs without delamination of a reflective portion of the wires. The WGP embodiments herein can have improved flexibility, stretchablility, compressibility, or combinations thereof with reduced cracking, collapse, and delamination of wires or ribs.

19 Claims, 7 Drawing Sheets

FLEXIBLE WIRE GRID POLARIZER

CLAIM OF PRIORITY

This is a continuation of U.S. Nonprovisional patent application Ser. No. 17/464,936, filed on Sep. 2, 2021; which is a continuation of U.S. Nonprovisional patent application Ser. No. 16/673,193, filed on Nov. 4, 2019; which claims priority to U.S. Provisional Patent Application No. 62/773,664, filed on Nov. 30, 2018; which are incorporated herein by reference.

FIELD OF THE INVENTION

The present application is related generally to wire grid polarizers.

BACKGROUND

Curved optical devices could benefit from a flexible wire grid polarizer. Manufacture of such WGP can be challenging due to cracking or delamination of WGP materials as the WGP is bent, stretched, or compressed.

SUMMARY

It has been recognized that it would be advantageous to manufacture a wire grid polarizer (WGP) which is flexible without significant formation or propagation of damaging cracks or delamination. The present invention is directed to various embodiments of WGPs, and methods of making WGPs, which satisfy these needs. The embodiments herein can have improved flexibility, stretchablility, compressibility, or combinations thereof with reduced cracking, collapse, and delamination of wires or ribs. Each embodiment may satisfy one, some, or all of these needs.

The WGP can comprise a flexible substrate, an array of wires on the flexible substrate, and each wire including a flexible rib and a polarizing rib.

The method can comprise applying an etch stop thin film on a flexible substrate; applying a polarizing thin film on the etch stop thin film; etching through the polarizing thin film and forming an array of polarizing ribs; etching through the etch stop thin film and forming an array of etch stop ribs aligned with the array of polarizing ribs; and etching into but not through the flexible substrate and forming an array of flexible ribs, aligned with the polarizing ribs and the etch stop ribs.

BRIEF DESCRIPTION OF THE DRAWINGS (DRAWINGS MIGHT NOT BE DRAWN TO SCALE)

FIG. 1 is a schematic, cross-sectional side-view of a wire grid polarizer (WGP) 10 comprising an array of wires 15 on a flexible substrate 11, with channels 14 between adjacent wires 15, each wire 15 including a flexible rib 12 and a polarizing rib 13, in accordance with an embodiment of the present invention.

FIG. 2 is a schematic perspective-view of WGP 10, in accordance with an embodiment of the present invention.

FIG. 3 is a schematic, cross-sectional side-view of a WGP 30, similar to WGP 10, but further comprising an etch stop rib 31 sandwiched between the flexible rib 12 and the polarizing rib 13, in accordance with an embodiment of the present invention.

FIG. 4 is a schematic, cross-sectional side-view of a WGP 40, similar to WGPs 10 or 30, but further comprising the flexible rib 12 and the flexible substrate 11 being a single, integral material, in accordance with an embodiment of the present invention.

FIG. 5 is a schematic, cross-sectional side-view of a WGP 50, similar to WGPs 10, 30, or 40, but further comprising each of the flexible ribs 12 having a narrowest cross-sectional profile at a distal end $12_d$ farthest from the flexible substrate 11, a gradually-widening cross-sectional profile moving towards the flexible substrate 11, and a widest cross-sectional profile at a proximal end $12_p$ closest to the flexible substrate 11, in accordance with an embodiment of the present invention.

FIG. 6a-d are schematic, cross-sectional side-views of polarizing ribs 13, illustrated without the rest of the WGP for clarity, in accordance with embodiments of the present invention.

Figure 11:
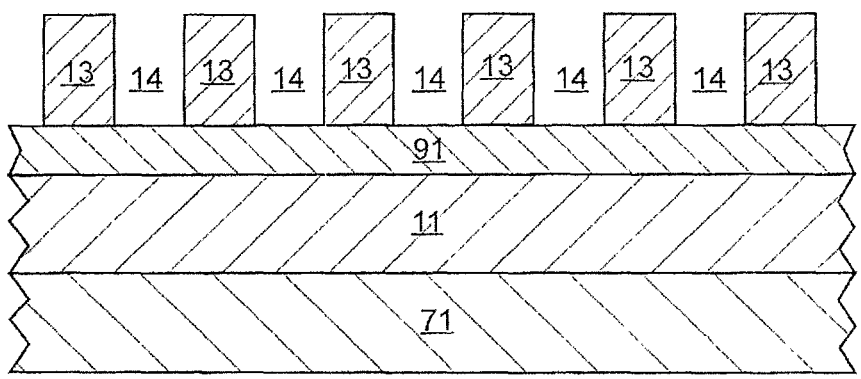

FIG. 11 is a schematic, cross-sectional side-view illustrating a step in a method of making a WGP, including etching through the polarizing thin film 103 and forming an array of polarizing ribs 13 with channels 14 between adjacent polarizing ribs 13, in accordance with an embodiment of the present invention.

Figure 12:
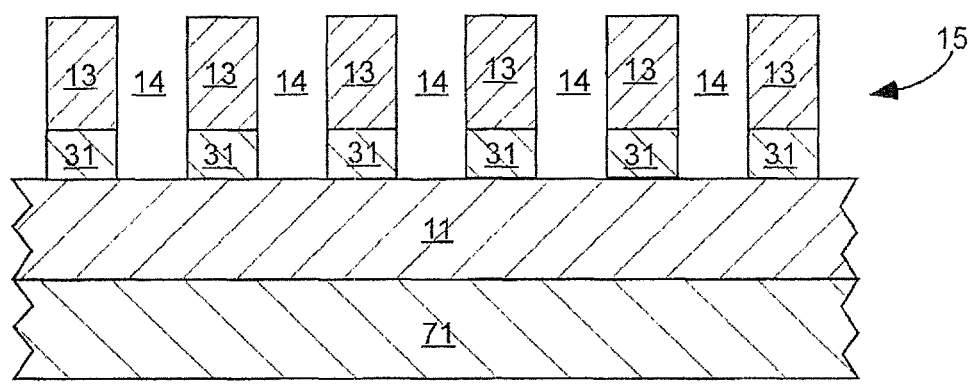

FIG. 12 is a schematic, cross-sectional side-view illustrating a step in a method of making a WGP, including etching through the etch stop thin film 91 and forming an array of elongated etch stop ribs 31, aligned with the array of polarizing ribs 13, with the channels 14 also between adjacent etch stop ribs 31, in accordance with an embodiment of the present invention.

Figure 13:
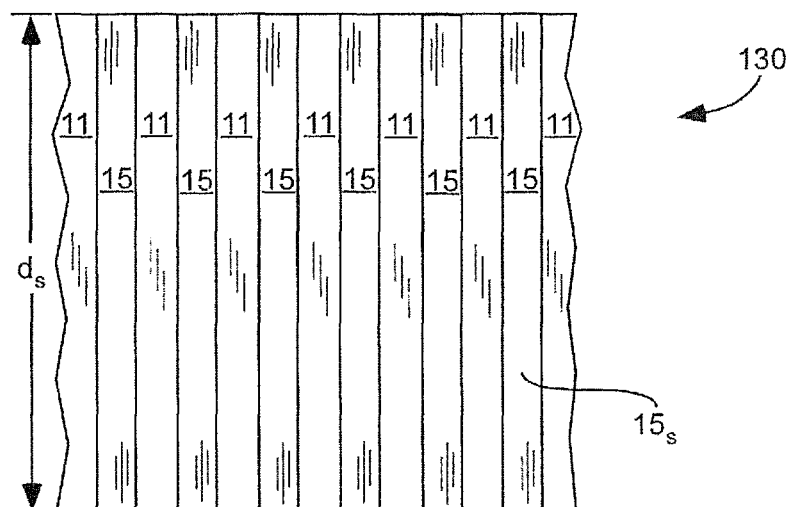

FIG. 13 is a schematic top-view of a WGP 130 with an array of wires 15 on a flexible substrate 11, the array of wires 15 being straight and defining a straight array $15_s$, in accordance with an embodiment of the present invention.

Figure 14A:
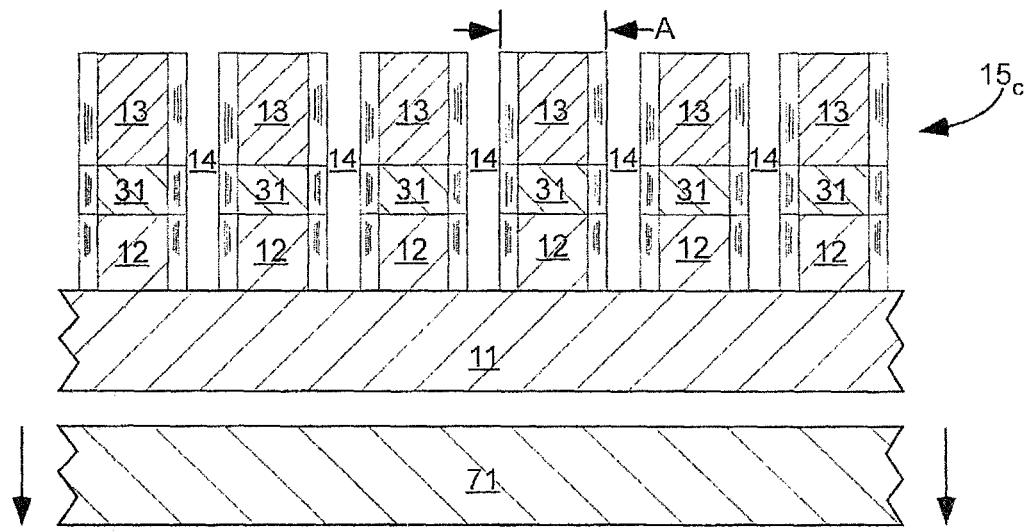

FIG. 14a is a schematic, cross-sectional side-view illustrating a step in a method of making a WGP, including releasing the flexible substrate 11 from the rigid substrate 71, allowing the flexible substrate to contract 11, and changing the array of wires 15 from a straight array $15_s$ to a curved array $15_c$, illustrating lateral waves, in accordance with an embodiment of the present invention.

Figure 14B:
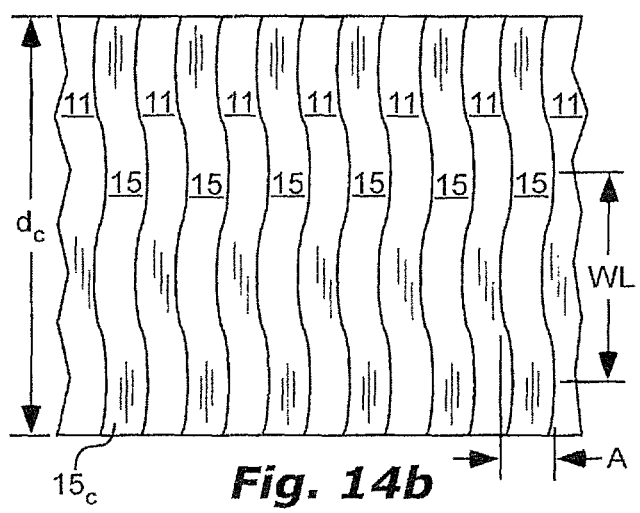

FIG. 14b is a schematic top-view of the step illustrated in FIG. 14a, illustrating lateral waves, in accordance with an embodiment of the present invention.

Figure 15:
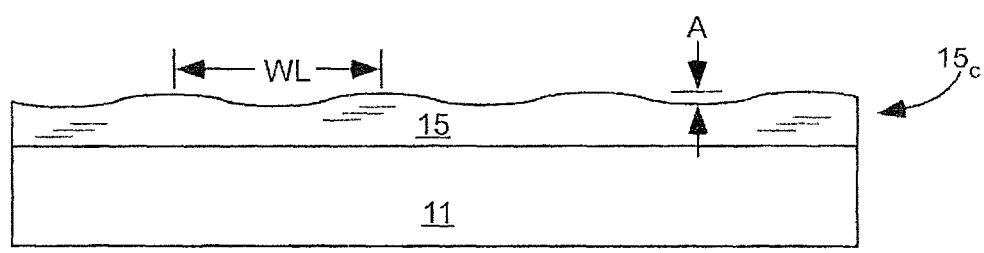

FIG. 15 is a schematic side-view of the step illustrated in FIG. 14a, but illustrating vertical waves, in accordance with an embodiment of the present invention.

Figure 16:
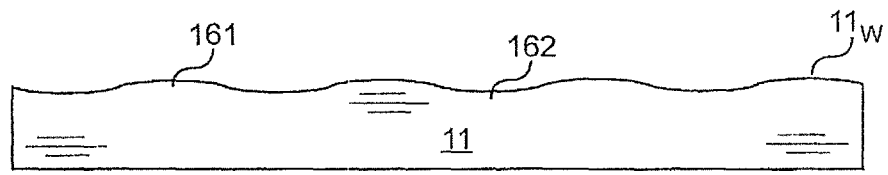

FIG. 16 is a schematic, cross-sectional side-view illustrating a step in a method of making a WGP, including providing a flexible substrate 11 with a wavy surface 11$_w$, in accordance with an embodiment of the present invention.

Figure 17:
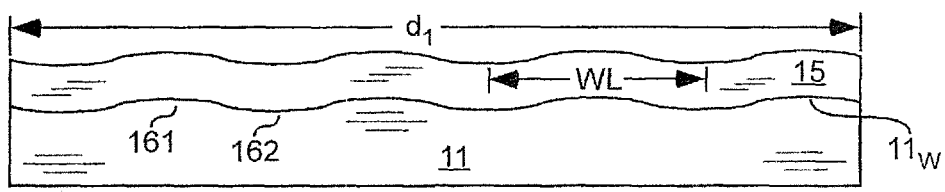

FIG. 17 is a schematic, cross-sectional side-view illustrating a step in a method of making a WGP, including etching to form an array of wires 15, each wire 15 including a flexible rib 12 (see FIGS. 1, 3-5, 12, and 14a), an etch stop rib 31 (see FIGS. 3-5, 12, and 14a), a polarizing rib 13 (see FIGS. 1, 3-5, 11-12, and 14a), or combinations thereof, the array of wires 15 having a wavy shape following a contour of the wavy surface 11$_w$, in accordance with an embodiment of the present invention.

Figure 18:
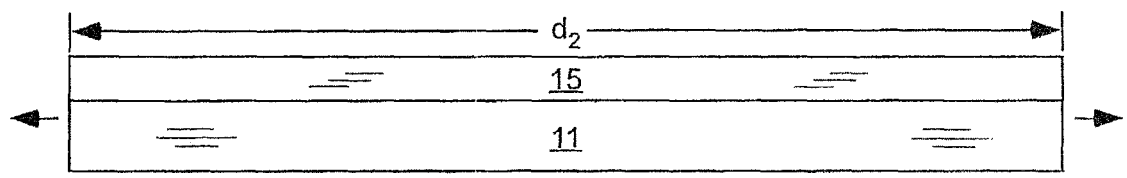

FIG. 18 is a schematic, cross-sectional side-view illustrating a step in a method of making a WGP, including stretching the flexible substrate 11, flattening the wavy shape and the wavy surface 11$_w$, in accordance with an embodiment of the present invention.

Figure 19:
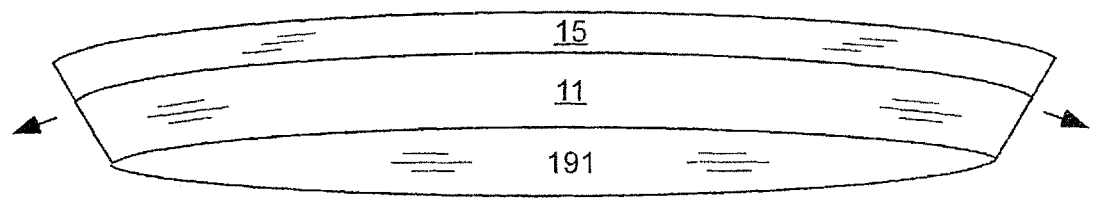

FIG. 19 is a schematic, cross-sectional side-view illustrating a step in a method of making a WGP, including stretching the flexible substrate 11 over a curved device 191, in accordance with an embodiment of the present invention.

DEFINITIONS

As used herein, the term "thin film" means a continuous layer that is not divided into a grid and has a thickness ≤10 µm, ≤1 µm, ≤0.5 µm, or ≤0.05 µm, which thickness may be specified in the claims, and which can be selected based on the light spectrum of interest.

As used herein, the term "elongated" means that a length L of the wires 15 is substantially greater than wire width W or wire thickness Th$_{15}$ (e.g. L can be ≥10 times, ≥100 times, ≥1000 times, or ≥10,000 times larger than wire width W and/or wire thickness Th$_{15}$). See FIG. 2.

As used herein, the term "flexible" includes flexible, stretchable, and compressible.

As used herein, the term "parallel" means exactly parallel, parallel within normal manufacturing tolerances, or nearly parallel, such that any deviation from exactly parallel would have negligible effect for ordinary use of the device.

As used herein, the term "nm" means nanometer(s), the term "µm" means micrometer(s), the term "mm" means millimeter(s), and the term "GPa" means gigapascals.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a specific wavelength range (e.g. ultraviolet, visible, or infrared spectrum) and can have a different property in a different wavelength range. Thus, whether a material is absorptive, reflective, or transparent is dependent on the intended wavelength range of use. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the specified wavelength range are "transparent" materials, materials with k>0.1 and R≤0.6 in the specified wavelength range are "absorptive" materials, and materials with k>0.1 and R>0.6 in the specified wavelength range are "reflective" materials.

Unless explicitly noted otherwise herein, all temperature-dependent values are such values at 25° C.

DETAILED DESCRIPTION

Figure 1:
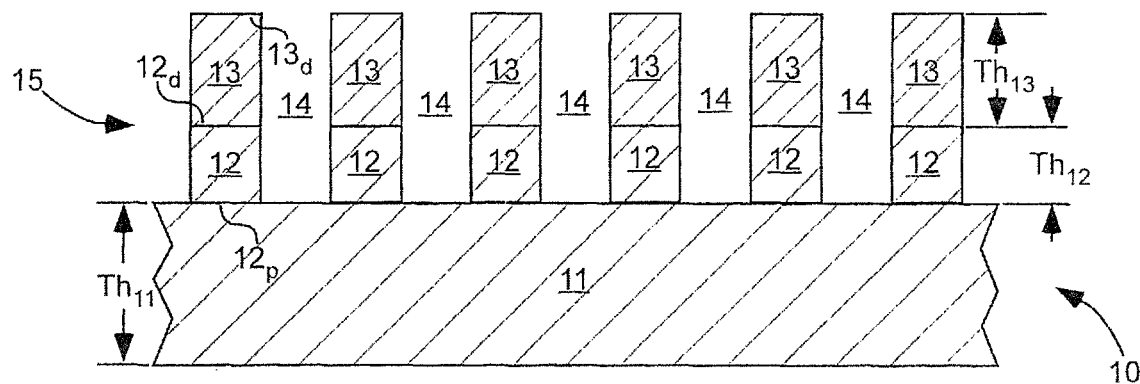
Figure 2:
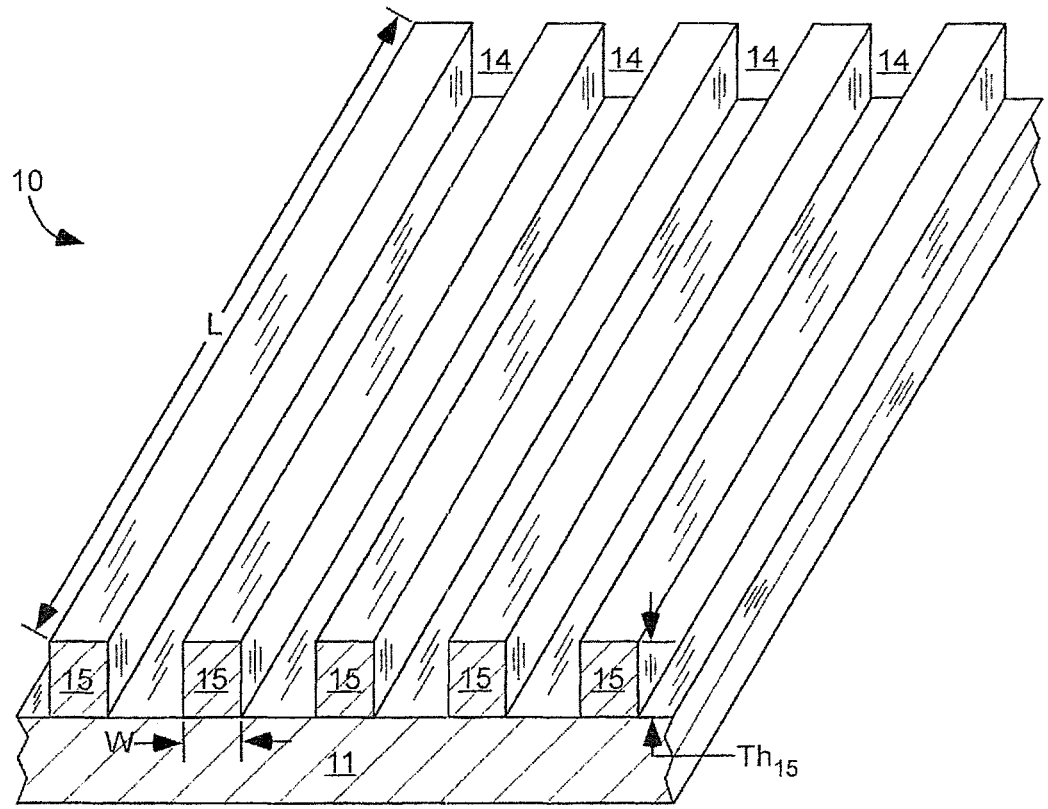

As illustrated in FIGS. 1-2, a wire grid polarizer (WGP) 10 is shown comprising an array of wires 15 on a flexible substrate 11 with channels 14 between adjacent wires 15. The WGP 10 can be flexible. As illustrated in FIG. 1, each wire of the array of wires 15 can include the following layers in the following order going outwards from the flexible substrate 11: a flexible rib 12 then a polarizing rib 13. The flexible rib 12 can allow the WGP to be more flexible and can help avoid cracking of other WGP components.

The wires 15 can be parallel, elongated, or both. The channels 14 can be filled with a solid material. Alternatively, the channels 14 can be air filled, such as for example from a distal end 13$_d$ of the polarizing rib 13 farthest from the flexible substrate 11 to a proximal end 12$_p$ of the flexible rib 12 closest to the flexible substrate 11.

Figure 3:
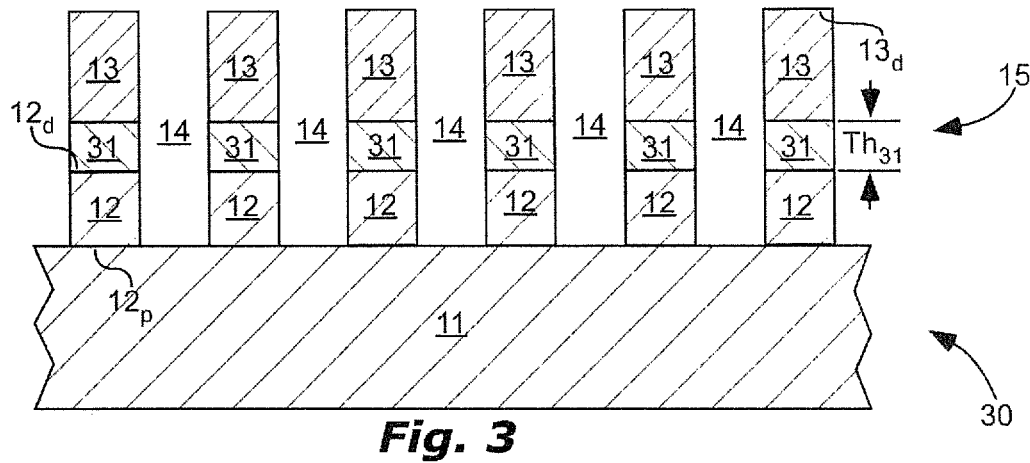
Figure 4:
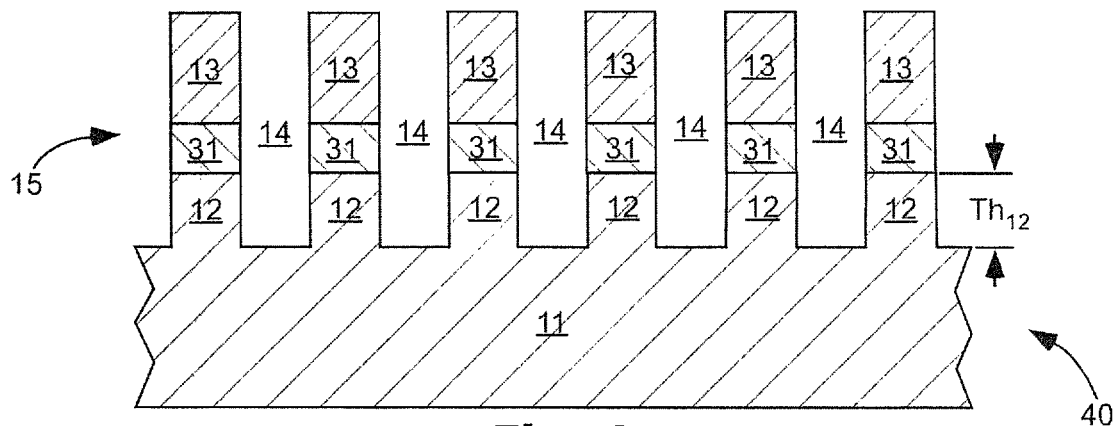
Figure 5:
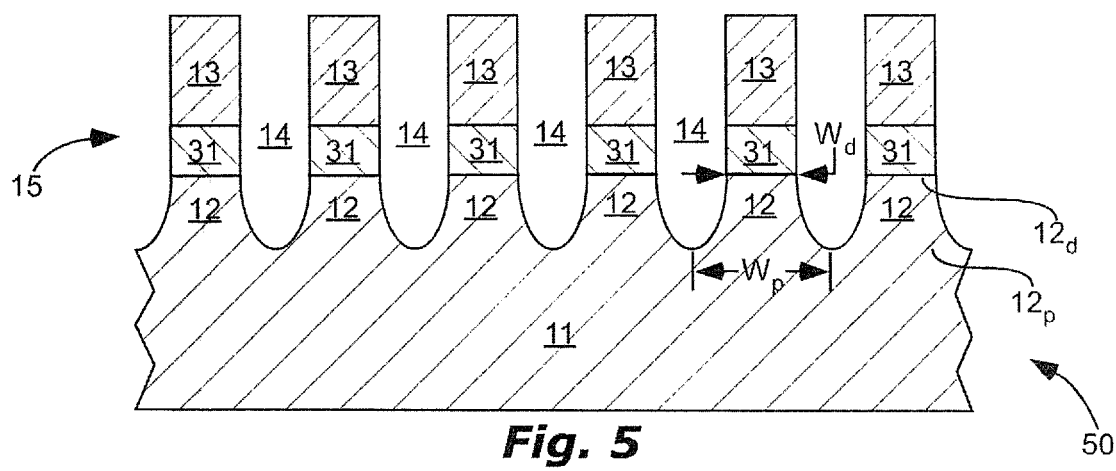

WGPs 30, 40, and 50, illustrated in FIGS. 3-5, are similar to WGP 10, with the following differences. Each wire of the array of wires 15 in WGPs 30, 40, and 50 can further comprise an etch stop rib 31 sandwiched between the flexible rib 12 and the polarizing rib 13. The etch stop rib 31 can be used to control the etch for formation of the polarizing rib 13, resulting in reduced delamination of the polarizing ribs 13. The etch stop rib 31 can also be used to prevent contamination of the etcher tool. Without the etch stop rib, material of the flexible rib 12 could contaminate the etcher tool during etch of the polarizing rib 13. As used herein, the term "etch stop" means a material that is more resistant to etching and etches slower than the overlying material or material intentionally being etched (polarizing rib 13 in this case). For example, the etch rate of the polarizing rib 13 divided by the etch rate of the etch stop (being formed into the etch stop rib 31) can be ≥1.5, ≥3, ≥10, ≥100, ≥1000.

As illustrated in FIGS. 4-5, the flexible rib 12 and the flexible substrate 11 can be a single, integral material. As illustrated in FIG. 5, each of the flexible ribs 12 have a narrowest cross-sectional profile (i.e. small W$_d$) at a distal end 12$_d$ farthest from the flexible substrate 11, a gradually-widening cross-sectional profile moving towards the flexible substrate 11, and a widest cross-sectional profile (i.e. large W$_p$) at a proximal end 12$_p$ closest to the flexible substrate 11. Although optimal rate of widening can vary according to application, following are example values of the width W$_p$ at the proximal end 12$_p$ divided by the width W$_d$ at the distal end 12$_p$: W$_p$/W$_d$≥1.2, W$_p$/W$_d$≥1.6, or W$_p$/W$_d$≥2.0, and W$_p$/W$_d$≤4 or W$_p$/W$_d$≤6. This gradually-widening cross-sectional profile can improve strength of the flexible ribs 12.

The shape of the channels 14, and thus also of the wires 15, can be controlled by adjusting the isotropic/anisotropic character of the etch and duration of the etch. For example, the etch for formation of the flexible ribs 12 on WGP 40 can be relatively more anisotropic and the etch for formation of the flexible ribs 12 on WGP 50 can be relatively more isotropic.

Figure 6A:
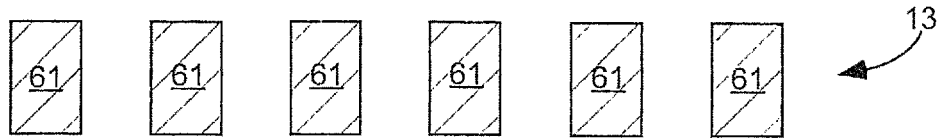
Figure 6B:
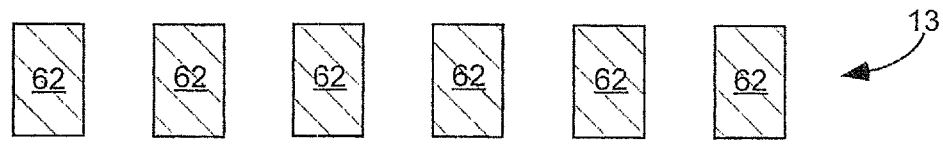
Figure 6C:
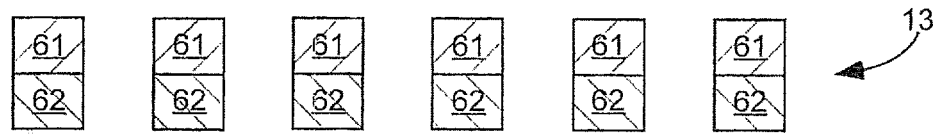
Figure 6D:
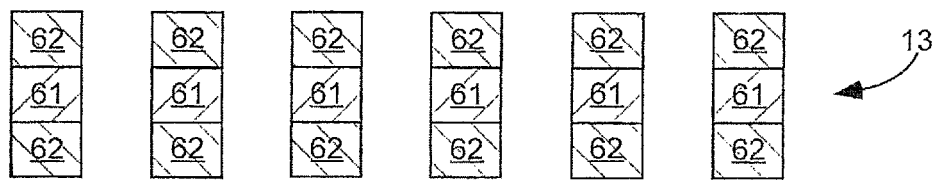

FIG. 6a-d are schematic, cross-sectional side-views of polarizing ribs 13, illustrated without the rest of the WGP for clarity. As illustrated in FIG. 6a, each polarizing rib 13 can comprise or consist of a reflective rib 61. As illustrated in FIG. 6b, each polarizing rib 13 can comprise or consist of an absorptive rib 62. As illustrated in FIG. 6c, each polarizing rib 13 can comprise or consist of a reflective rib 61 and an absorptive rib 62. Each polarizing rib 13 can include multiple reflective ribs 61, multiple absorptive ribs 62, or both. As illustrated in FIG. 6d, each polarizing rib 13 can comprise or consist of a reflective rib 61 sandwiched between two absorptive ribs 62. This embodiment in FIG. 6d can be particularly useful for absorbing stray light from each of two opposite sides of the WGP. Reflective structures, such as the reflective rib 61, and absorptive structures, such as the absorptive rib 62, are defined above in the definitions section.

Each reflective rib 61 can be made of or can include materials for polarization of light, including metals, semiconductors, dielectrics, or both, as are typically used in wire grid polarizers. See for example U.S. Pat. Nos. 7,961,393 and 8,755,113, which are incorporated herein by reference. For example, the reflective rib 61 can include aluminum, such as for example $\geq 50$, $\geq 70$, $\geq 90$, or $\geq 95$ mass percent aluminum.

Each absorptive rib 62 can be made of or can include materials which are primarily absorptive of light in the light spectrum of use. For example, the absorptive rib 62 can include germanium, silicon, or both. Each absorptive rib 62 can include $\geq 70$, $\geq 90$, $\geq 95$, or $\geq 99$ mass percent silicon. Each absorptive rib 62 can include $\geq 70$, $\geq 90$, $\geq 95$, or $\geq 99$ mass percent germanium.

Each etch stop rib 31, and the etch stop thin film 91 described below, can be made of material(s) that are resistant to the etch used in formation of the polarizing ribs 13. For example, the etch stop rib 31 can be made of a material resistant to a chloride dry etch. Example materials of the etch stop rib 31 include a metal oxide, a metalloid oxide, a metal oxide or a metalloid oxide with embedded organic moieties (e.g. deposited through solgel process), a nitride, a carbide, a ceramic, a semiconductor, carbon (e.g. spin-on or graphitic). The etch stop rib 31 can include silicon dioxide, such as for example $\geq 50$, $\geq 70$, $\geq 90$, $\geq 95$, or $\geq 99$ mass percent silicon dioxide. The etch stop rib 31 can be transparent in or across the ultraviolet spectrum, the visible spectrum, the infrared spectrum, or combinations thereof.

It can be helpful to consider the following characteristics in selection of material for the flexible substrate 11 and for the flexible ribs 12: heat resistance, durability, optical properties, adhesion strength, elastic modulus, fracture toughness, elongation at break, glass transition temperature, coefficient of thermal expansion, flexibility, and residual stress from thermal processing. For example, the flexible rib 12, the flexible substrate 11, or both can comprise a gel, a polymer, or both. For example, the flexible rib 12, the flexible substrate 11, or both can comprise a weight percent of $\geq 50\%$, $\geq 70\%$, $\geq 90\%$, $\geq 95\%$, or $\geq 99\%$ polymer. One suitable polymeric material for some applications is polyimide. For example, the flexible rib 12, the flexible substrate 11, or both can comprise a weight percent of $\geq 50\%$, $\geq 70\%$, $\geq 90\%$, $\geq 95\%$, or $\geq 99\%$ polyimide. As another example, the flexible rib 12, the flexible substrate 11, or both can comprise a weight percent of $\geq 50\%$, $\geq 70\%$, $\geq 90\%$, $\geq 95\%$, or $\geq 99\%$ gel. The gel can comprise a colloidal gel, a polymeric gel, or both.

The flexible substrate 11, the flexible rib 12, or both can have a modulus of elasticity adapted to the specific application. For example, the modulus of elasticity of the flexible substrate 11, the flexible rib 12, or both can be $\leq 5$ GPa, $\leq 3$ GPa, $\leq 1$ GPa, or $\leq 0.1$ GPa. The modulus of elasticity the flexible substrate 11, the flexible rib 12, or both can be $\geq 0.1$ GPa, $\geq 0.01$ GPa, $\geq 0.005$ GPa, $\geq 0.001$ GPa, or $\geq 0.0001$ GPa.

Selection of thickness for each material can be useful for optimizing optical properties, flexibility, and durability of the WGP. Although optimal thickness can vary according to application, some examples of possibly-effective thicknesses include the following.

Example minimum thicknesses $Th_{11}$ of the flexible substrate 11 include $\geq 0.4$ μm, $\geq 0.5$ μm, $\geq 4$ μm, or $\geq 10$ μm. Example maximum thicknesses $Th_{11}$ of the flexible substrate 11 include $\leq 20$ μm, $\leq 50$ μm, $\leq 100$ μm, $\leq 150$ μm, or $\leq 450$ μm. Example minimum thicknesses $Th_{12}$ of the flexible rib 12 include $\geq 5$ nm, $\geq 10$ nm, $\geq 25$ nm, or $\geq 100$ nm. Example maximum thicknesses $Th_{12}$ of the flexible rib 12 include $\leq 100$ nm, $\leq 250$ nm, or $\leq 750$ nm. Thicker flexible ribs can allow greater WGP flexibility but can also result in increased chance of toppling, irregular periodicity, and less linearity in the nanowires upon subsequent wire grid stretching and transfer/assembly steps. The need for flexibility can be balanced against the need for durability and performance for each application.

Example minimum thicknesses $Th_{31}$ of the etch stop rib 31 include $\geq 1$ nm, $\geq 5$ nm, $\geq 15$ nm, or $\geq 30$ nm. Example maximum thicknesses $Th_{31}$ of the etch stop rib 31 include $\leq 35$ nm, $\leq 60$ nm, $\leq 120$ nm, $\leq 300$ nm, or $\leq 600$ nm. Example minimum thicknesses $Th_{13}$ of the polarizing rib 13 include $\geq 50$ nm or $\geq 150$ nm. Example maximum thicknesses $Th_{13}$ of the polarizing rib 13 include $\leq 300$ nm, $\leq 400$ nm, or $\leq 600$ nm.

The flexible substrate 11 can be a stack of polymer film layers, a stack of gel film layers, or combinations thereof. One or more of these layers can be a release layer to improve release from from a more rigid substrate 71, as described below.

Methods of making a WGP can comprise some or all of the following steps, which can be performed in the following order or other order if so specified. Some of the steps can be performed simultaneously unless explicitly noted otherwise in the claims. There may be additional steps not described below. These additional steps may be before, between, or after those described. Components of the WGP, and the WGP itself, can have properties as described above.

A rigid substrate 71 is illustrated in FIGS. 7-14. The rigid substrate 71 is not required for all method embodiments that use steps in these figures. Thus, for some embodiments referring to some of FIGS. 7-14, the rigid substrate 71 is optional. Examples of a modulus of elasticity of the rigid substrate 71 include $\geq 10$ GPa, $\geq 15$ GPa, $\geq 25$ GPa, $\geq 40$ GPa, or $\geq 50$ GPa.

Figure 7:
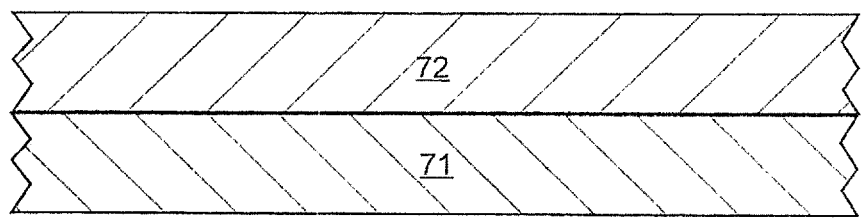
FIG. 7 is a schematic, cross-sectional side-view illustrating a step in a method of making a WGP, including applying an uncured layer 72 on a rigid substrate 71, in accordance with an embodiment of the present invention.

In a first embodiment, the method can include applying an uncured layer 72 on a rigid substrate 71, as illustrated in FIG. 7. Example materials in the uncured layer 72 include polymer(s), gel(s), resin(s), monomer(s), oligomer(s), or combinations thereof. Any of these materials can be in a solution. Any of these materials can include a crosslinking additive, a plasticizer, or both. The crosslinking additive can be thermal activated, photoactivated, or both.

Figure 8:
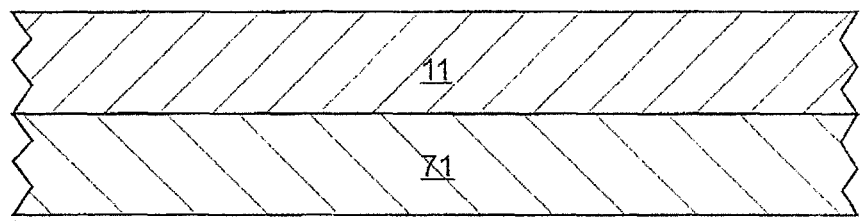
FIG. 8 is a schematic, cross-sectional side-view illustrating a step in a method of making a WGP, including curing the uncured layer 72 to form a flexible substrate 11, in accordance with an embodiment of the present invention.
Figure 9:
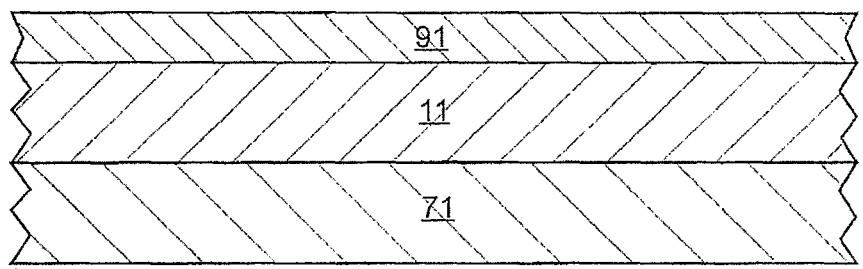
FIG. 9 is a schematic, cross-sectional side-view illustrating a step in a method of making a WGP, including applying an etch stop thin film 91 on the flexible substrate 11, in accordance with an embodiment of the present invention.
Figure 10:
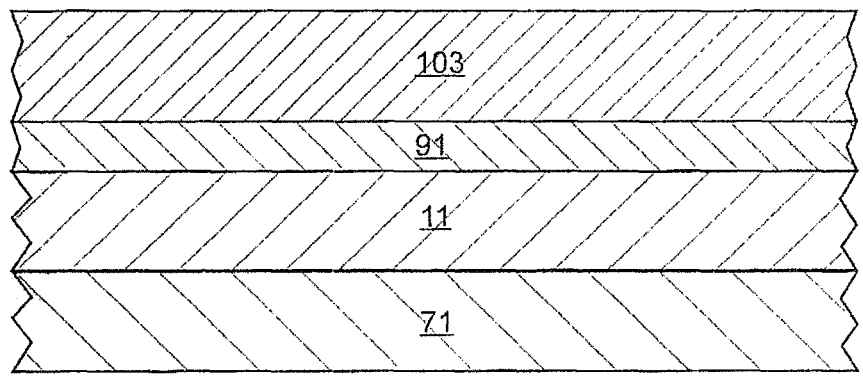
FIG. 10 is a schematic, cross-sectional side-view illustrating a step in a method of making a WGP, including applying a polarizing thin film 103 on the etch stop thin film 91, in accordance with an embodiment of the present invention.

The method can also include curing the uncured layer 72 to form a flexible substrate 11, as illustrated in FIG. 8. Curing can include polymerizing, crosslinking, or both. The flexible substrate 11 can be a solid and can be flexible.

The method can include applying an etch stop thin film 91 on a flexible substrate 11 then applying a polarizing thin film 103 on the etch stop thin film 91. See FIGS. 9-10.

Another step in the method, illustrated in FIG. 11, can include etching (e.g. dry etch) through the polarizing thin film 103 and forming an array of polarizing ribs 13 with channels 14 between adjacent polarizing ribs 13.

An additional step in the method can include etching (e.g. dry etch) through the etch stop thin film 91 and forming an array etch stop ribs 31 with the channels 14 also between adjacent etch stop ribs 31. The array of etch stop ribs 31 can be aligned with the array of polarizing ribs 13. Etching through the etch stop thin film 91 can be performed with the same recipe used to etch the polarizing thin film 103 if the mask layer used for etching the polarizing ribs 13 is thick enough and depending on the chemistry and other characteristics of the etch. It can be useful to etch through the etch stop thin film 91 with a different recipe than used to etch the polarizing thin film 103. See FIG. 12.

A further step in the method can include etching (e.g. dry etch) into but not through the flexible substrate 11 and forming an array of flexible ribs 12 with the channels 14 between adjacent flexible ribs 12. The array of flexible ribs 12 can be aligned with the array of polarizing ribs 13 and the array of etch stop ribs 31. Etching into the flexible substrate 11 can be performed with the same recipe used to etch the etch stop ribs 31 if this etch recipe does not etch the polarizing ribs appreciably, or if the remaining masking layer for the polarizing ribs is thick enough, and depending on the chemistry and other characteristics of the etch. See FIGS. 1 and 3-5.

The aforementioned etching can include patterning and etching the array of wires 15 (including the array of polarizing ribs 13, the array of etch stop ribs 31, and the array of flexible ribs 12) into a curved array 15$_c$ (see FIG. 15). One example of patterning can be nanoimprint lithography.

After forming the WGP like those illustrated in FIG. 1-5 or 12 if the flexible substrate 11 is affixed to a rigid substrate 71, another step in the method can include releasing the flexible substrate 11 from the rigid substrate 71, allowing the flexible substrate 11 to contract, which can change the array of wires 15 from a straight array 15$_s$ to a curved array 15$_c$. See FIGS. 14*a*-15. This can include changing the array of polarizing ribs 13, the array of etch stop ribs 31, the array of the flexible ribs 12, or combinations thereof from a straight array 15$_s$ to a curved array 15$_c$. As illustrated in FIGS. 14*a*-14*b*, the curved array 15*c* can include waves in a lateral direction. As illustrated in FIGS. 14*a*-14*b*, the curved array 15*c* can include waves in a vertical direction. The curved array 15*c* can include waves in both lateral and vertical direction. Wave direction (lateral, vertical, or both), wavelength WL, and wave amplitude A can be controlled as described below.

Due to contraction of the flexible substrate 11 and curvature of the wires 15, a straight-line distance between ends of the array of wires 15 can be reduced. For example, $$\frac{d_s - d_c}{d_s} \geq 0.05,$$

$$\frac{d_s - d_c}{d_s} \geq 0.1,$$

$$\frac{d_s - d_c}{d_s} \geq 0.25,$$

$$\frac{d_s - d_c}{d_s} \geq 0.5,$$

or $$\frac{d_s - d_c}{d_s} \geq 0.75,$$

where $d_s$ is a straight-line distance between ends of the array of wires of the straight array 15$_s$ and $d_c$ is a straight-line distance between ends of the array of wires of the curved array 15$_c$.

As illustrated in FIGS. 18-19, the method can further comprise stretching the flexible substrate 11, and thus straightening (partially or completely) the wires 15. In FIG. 19, the flexible substrate 11 is stretched over a curved device 191, which can be an optical device such as a lens.

In a second embodiment, the method can include providing a flexible substrate with a wavy surface 11$_w$. See FIG. 16 with lumps or ridges 16 and valleys or grooves 162. The flexible substrate 11 can have properties as described above. The wavy surface 11$_w$ can be formed by methods such as indenting, scratching, rubbing, molding, lithography (e.g. exposure to light to polymerize or crosslink in selected locations), lithography plus etching, or combinations thereof.

The method can include forming an array of wires 15 on the flexible substrate 11 with the wavy surface 11$_w$. See FIG. 17. Forming the array of wires 15 on the flexible substrate 11 can comprise applying an etch stop thin film 91 (FIG. 9), a polarizing thin film 103 (FIG. 10), or both on the flexible substrate 11. Typically, the etch stop thin film 91 would be applied first, then the polarizing thin film 103. Forming the array of wires 15 on the flexible substrate 11 can also include etching through the polarizing thin film 103, forming an array of polarizing ribs 13 with channels 14 between adjacent polarizing ribs 13 (FIG. 11); etching through the etch stop thin film 91 and forming an array of etch stop ribs 31 with the channels 14 also between adjacent etch stop ribs 31 (FIG. 12); etching into but not through the flexible substrate 11, forming an array of flexible ribs 12 with the channels 14 also between adjacent flexible ribs 12 (FIGS. 3-5); or combinations thereof. The array of etch stop ribs 31, the array of flexible ribs 12, or both can be aligned with the array of polarizing ribs 13. More details of these etches are described above. The polarizing ribs 103, the etch stop ribs 31, or both can have a wavy shape following a contour of the wavy surface 11$_w$ of the flexible substrate 11. See the wavy shape of the wires 15 on the wavy surface 11$_w$ of the flexible substrate 11 in FIG. 17.

As illustrated in FIGS. 18-19, the method can further comprise stretching the flexible substrate 11, and thus flattening (partially or completely) the wavy shape of the wires 15 (including the wavy shape of the polarizing ribs 103, the etch stop ribs 31, or both) and the wavy surface 11$_w$ of the flexible substrate 11. In FIG. 19, the flexible substrate 11 is stretched over a curved device 191, which can be an optical device such as a lens.

Due to stretching of the flexible substrate 11 and flattening of the wires 15 (including the wavy shape of the polarizing ribs 103, the etch stop ribs 31, or both), a straight-line distance between ends of the array of wires 15 (including the polarizing ribs 103, the etch stop ribs 31, or both) can be increased. For example, $$0.01 \leq \frac{d_2 - d_1}{d_1},$$

$$0.05 \leq \frac{d_2 - d_1}{d_1},$$

$$0.1 \leq \frac{d_2 - d_1}{d_1},$$

-continued $$0.25 \le \frac{d_2 - d_1}{d_1},$$

or $$0.5 \le \frac{d_2 - d_1}{d_1},$$

and $$\frac{d_2 - d_1}{d_1} \le 0.05,$$

$$\frac{d_2 - d_1}{d_1} \le 1,$$

$$\frac{d_2 - d_1}{d_1} \le 3,$$

$$\frac{d_2 - d_1}{d_1} \le 5,$$

or $$\frac{d_2 - d_1}{d_1} \le 10,$$

where $d_1$ is a straight-line distance between ends of the array of polarizing ribs before stretching and $d_2$ is a straight-line distance between ends of the array of polarizing ribs after stretching.

In the various embodiments described above, waves of the wavy shape and wavy surface $11_w$ can be periodic or aperiodic. The waves can be lateral (parallel to a plane of a surface of the flexible substrate 11 on which the array of wires 15 are located, as illustrated in FIGS. 14a-14b), vertical (perpendicular to a plane of a surface of the flexible substrate 11 on which the array of wires 15 are located, as illustrated in FIG. 15), or both. Example wavelengths WL of the wavy shape and wavy surface $11_w$ include ≥1 nm, ≥10 nm, ≥100 nm, or ≥500 nm and ≤500 nm, ≤1 µm, ≤100 µm, or ≤1 mm. Example relationships between wave amplitude A and wavelength WL include: A≥0.01*WL, A≥0.05*WL, A≥0.1*WL, A≥0.25*WL, A≥0.5*WL, or A≥0.75*WL; and A≤0.75*WL, A WL, A≤1.5*WL, A≤2*WL, or A≤4*WL.

Wave characteristics, such as wave direction (lateral, vertical, or both), wavelength WL, and wave amplitude A, can be modified as desired. It might be desirable to modify wave characterics to allow a desired amount of strain without excessive stress and failure, such as by cracking or delamination. For example, if the uncured layer 72 is photocurable, then exposure time, location, or both can be modified to control wave characterics. If the uncured layer 72 is thermally curable, then cure temperature can be modified to control wave characterics. Rapid thermal annealing, laser annealing, or both, or otherwise modifying the extent of the cure, can be used to control wave characterics. Wave characerics can be controlled after release from the rigid substrate 71 by heating, which will typically increase wavelength WL and decrease amplitude A, or cooling, which will typically increase wavelength WL and decrease amplitude A.

What is claimed is:

1. A wire grid polarizer (WGP) comprising:
    a flexible substrate;
    an array of wires on the flexible substrate with channels between adjacent wires;
    each wire of the array of wires including the following layers in the following order going outwards from the flexible substrate: a flexible rib, an etch stop rib, then a polarizing rib;
    the flexible substrate and the flexible rib being a single, integral material, each comprising a weight percent of ≥50% polymer, and each having a modulus of elasticity of ≤5 GPa and ≥0.001 GPa;
    the etch stop rib is resistant to a chloride dry etch, and the etch stop rib is transparent across the visible spectrum.

2. The WGP of claim 1, wherein the flexible substrate comprises polyimide.

3. The WGP of claim 1, wherein 0.5 µm≤$Th_{11}$≤50 µm, where $Th_{11}$ is a thickness of the flexible substrate.

4. The WGP of claim 1, wherein:
    each of the flexible ribs have a narrowest cross-sectional profile at a distal end farthest from the flexible substrate, a gradually-widening cross-sectional profile moving towards the flexible substrate, and a widest cross-sectional profile at a proximal end closest to the flexible substrate; and
    $W_p/W_d$≥1.6, where $W_p$ is a width of the widest cross-sectional profile at a proximal end and $W_d$ is a width of the narrowest cross-sectional profile at a distal end.

5. The WGP of claim 1, wherein each polarizing rib includes a reflective rib and an absorptive rib.

6. The WGP of claim 1, wherein each polarizing rib includes a reflective rib sandwiched between two absorptive ribs.

7. A wire grid polarizer (WGP) comprising:
    a polymer substrate;
    an array of wires on the polymer substrate with channels between adjacent wires; and
    each wire of the array of wires including the following layers in the following order going outwards from the polymer substrate: a polymer rib, an etch stop rib, then a reflective rib.

8. The WGP of claim 7, wherein the etch stop rib is resistant to a chloride dry etch and is transparent across the visible spectrum.

9. The WGP of claim 7, wherein the etch stop rib includes a metal oxide, a metalloid oxide, a nitride, or combinations thereof.

10. The WGP of claim 7, wherein the etch stop rib includes ≥90% silicon dioxide and the reflective rib includes ≥90% aluminum.

11. The WGP of claim 7, wherein 5 nm≤$Th_E$≤60 nm, where $Th_E$ is a thickness of the etch stop rib.

12. The WGP of claim 7, wherein the polymer rib and the polymer substrate are flexible, and are a single, integral material.

13. The WGP of claim 7, wherein the polymer rib and the polymer substrate each comprise ≥90% polyimide.

14. The WGP of claim 7, wherein 5 µm≤$Th_S$≤50 µm, where $Th_S$ is a thickness of the polymer substrate; and 50 nm≤$Th_R$≤400 nm, where $Th_R$ is a thickness of the reflective rib.

15. The WGP of claim 7, wherein the polymer rib and the polymer substrate are flexible, and 10 nm≤$Th_P$≤100 nm, where $Th_P$ is a thickness of the polymer rib.

16. The WGP of claim 7, wherein the polymer rib and the polymer substrate are flexible, and 100 nm≤$Th_P$≤250 nm, where $Th_P$ is a thickness of the polymer rib.

17. The WGP of claim 7, wherein each of the channels is air filled from a distal end of the reflective rib farthest from the polymer substrate to a proximal end of the polymer rib closest to the polymer substrate.

18. The WGP of claim 7, wherein:
    each of the polymer ribs have a narrowest cross-sectional profile at a distal end farthest from the polymer substrate;

a gradually-widening cross-sectional profile moving towards the polymer substrate; and a widest cross-sectional profile at a proximal end closest to the polymer substrate.

19. The WGP of claim 18, wherein the gradually-widening cross-sectional profile forms a half-elliptical cross-sectional shape of the channels with eccentricity of ≥0.70 and ≤0.98.

* * * * *